(12) United States Patent
Nishino et al.

(10) Patent No.: US 10,600,544 B2
(45) Date of Patent: *Mar. 24, 2020

(54) STACKED BODY AND METHOD OF PRODUCING STACKED BODY

(71) Applicant: Murata Manufacturing Co., Ltd., Nagaokakyo-shi, Kyoto-fu (JP)

(72) Inventors: Kosuke Nishino, Nagaokakyo (JP); Kuniaki Yosui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,341

(22) Filed: Oct. 30, 2018

(65) Prior Publication Data

US 2019/0066895 A1 Feb. 28, 2019

Related U.S. Application Data

(63) Continuation of application No. 14/864,948, filed on Sep. 25, 2015, now Pat. No. 10,147,529, which is a (Continued)

(30) Foreign Application Priority Data

Nov. 28, 2013 (JP) ................. 2013-246486

(51) Int. Cl.
*G02B 7/02* (2006.01)
*H01L 27/08* (2006.01)
(Continued)

(52) U.S. Cl.
CPC ............... *H01F 7/20* (2013.01); *G02B 7/02* (2013.01); *G02B 27/646* (2013.01); *G03B 5/00* (2013.01);
(Continued)

(58) Field of Classification Search
CPC .............. G11B 7/0935; G11B 7/0932; H01F 27/2847; H01F 27/303; H01F 17/0013;
(Continued)

(56) References Cited

U.S. PATENT DOCUMENTS 6,584,045 B1 * 6/2003 Ishii .................. G11B 11/10534
369/13.17
2014/0306787 A1 * 10/2014 Kato .................... H01F 17/0013
336/105

FOREIGN PATENT DOCUMENTS

WO WO-2013099540 A1 * 7/2013 ......... H01F 17/0013

OTHER PUBLICATIONS

Nishino et al., "Electromagnet, Camera Lens Driving Device, and Production Method of Electromagnet", U.S. Appl. No. 14/864,948, filed Sep. 25, 2015.

* cited by examiner

*Primary Examiner* — Dawayne Pinkney
(74) *Attorney, Agent, or Firm* — Keating & Bennett, LLP

(57) ABSTRACT

A stacked body includes a base including insulating base material layers made of thermoplastic resin and stacked, a circuit including a conductive pattern located on the insulating base material layers, and a dummy pattern electrically isolated from the circuit and extending along a portion of the circuit outside of the circuit on the insulating base material layers on which the conductive pattern is located in a plan view. The conductive pattern includes a linear portions at an outermost side of the circuit in a plan view. A bent portion or a wide portion, which has a larger width than the other linear portions in a direction perpendicular or substantially perpendicular to a direction in which a linear portion extends, in a plan view, is located on at least one of the linear (Continued)

portion of the conductive pattern and the dummy pattern extending along the linear portion.

16 Claims, 15 Drawing Sheets

Related U.S. Application Data continuation of application No. PCT/JP2014/074035, filed on Sep. 11, 2014.

(51) Int. Cl.
| | | |
|---|---|---|
| *H01F 27/30* | (2006.01) | |
| *H01F 27/28* | (2006.01) | |
| *H01F 7/20* | (2006.01) | |
| *G03B 5/00* | (2006.01) | |
| *H02K 41/035* | (2006.01) | |
| *H01F 5/00* | (2006.01) | |
| *G02B 27/64* | (2006.01) | |
| *H02K 3/26* | (2006.01) | |

(52) U.S. Cl.
CPC .......... *H01F 5/003* (2013.01); *H02K 41/0356* (2013.01); *G03B 2205/0007* (2013.01); *G03B 2205/0069* (2013.01); *H02K 3/26* (2013.01)

(58) Field of Classification Search
CPC ........ H01F 41/127; H01F 5/02; H01F 37/005; H01F 6/06; H01F 17/0006; H01L 23/5227; H01L 7/0932; G02B 7/14; G02B 25/002; G02B 15/173; G02B 7/04; G02B 7/021; G02B 7/10; G02B 7/02; G02B 7/102
USPC .................. 359/811–830; 257/531, 547; 336/221–225, 199, 200, 205, 208, 232
See application file for complete search history.

STACKED BODY AND METHOD OF PRODUCING STACKED BODY

BACKGROUND OF THE INVENTION

1. Field of the Invention

The present invention relates to a stacked body including a circuit located on a base including an insulating base material layer, and a method of producing such a stacked body.

2. Description of the Related Art

Japanese Unexamined Patent Publication No. H62-77048 describes a voice coil motor including a coil and a permanent magnet. In this publication, a planar helical coil is formed on each of a plurality of substrates, and these substrates are stacked to form a coil.

Meanwhile, a voice coil motor is an actuator that utilizes a change in a magnetic field caused by a change in a current flowing through a coil, and a magnetic field generated by a permanent magnet. Such a voice coil motor is used for a camera shake correction, etc. If the voice coil motor has poor responsiveness, performance of a device to which this voice coil motor is used also becomes poor. Therefore, an actuator having excellent responsiveness has been demanded, and for such actuator, increasing electromagnetic force with an electromagnet has been demanded.

SUMMARY OF THE INVENTION

A stacked body according to a preferred embodiment of the present invention includes a base including a plurality of insulating base material layers made of thermoplastic resin; a circuit including a conductive pattern located on the plurality of insulating base material layers; and a dummy pattern electrically isolated from the circuit and extending along at least a portion of the circuit outside of the circuit on the plurality of insulating base material layers on which the conductive patter is located in a plan view; wherein the plurality of insulating base material layers are stacked on each other; the conductive pattern includes a plurality of linear portions at an outermost side of the circuit; and a bent portion or a wide portion, which has a larger width than the other linear portions in a direction perpendicular or substantially perpendicular to a direction in which a linear portion extends, in a plan view, is located on at least one of the linear portion of the conductive pattern and the dummy pattern extending along the linear portion.

When the insulating base material layers made of thermoplastic resin are stacked, and the stacked layers are integrated by hot pressing, the conductive pattern or the dummy pattern is likely to be twisted (to tilt in the stacking direction) with the flow of the resin, so that the patterns might be in contact with each other and short-circuited. The configuration described above prevents the conductive pattern or the dummy pattern from being twisted by the bent portion or the wide portion, thus significantly reducing the possibility in which the patterns are short-circuited (the patterns are in contact with each other).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
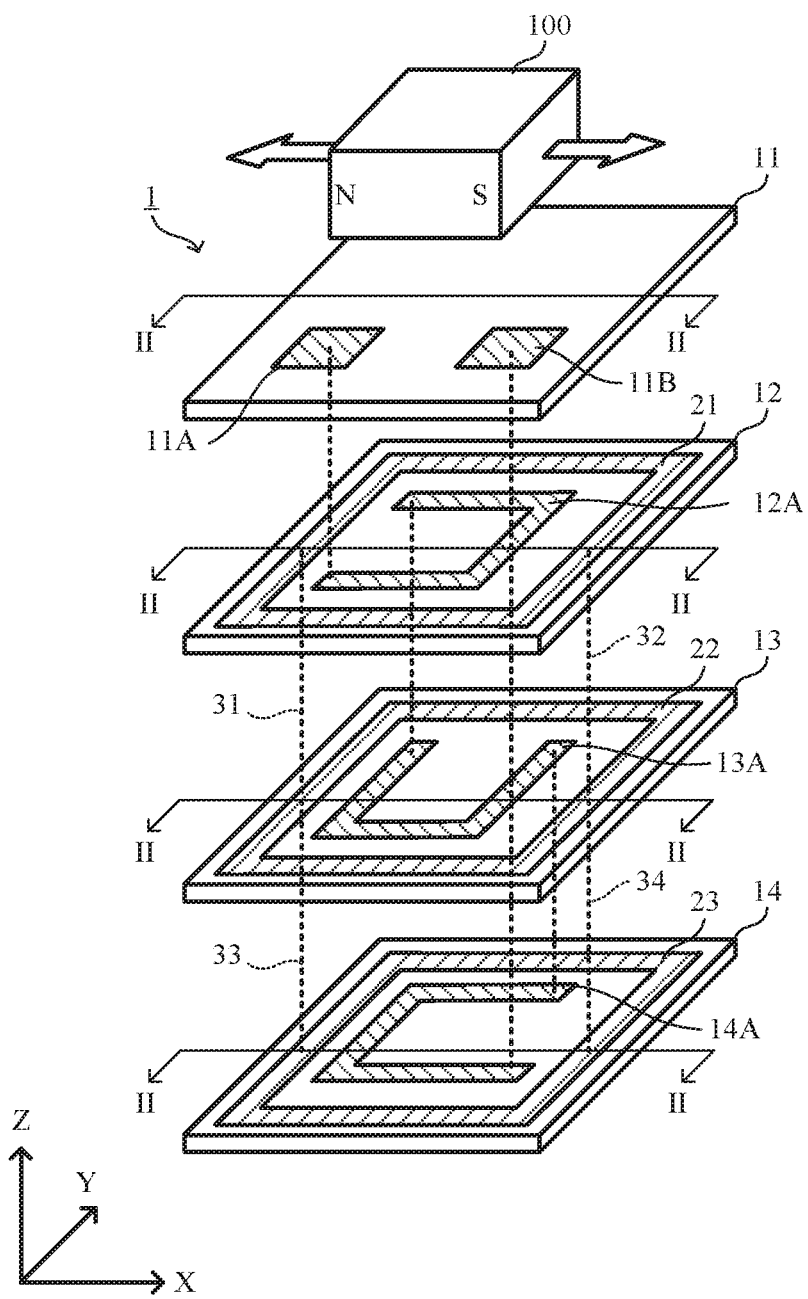
FIG. 1 is an exploded perspective view of an electromagnet according to a first preferred embodiment of the present invention.
Figure 2:
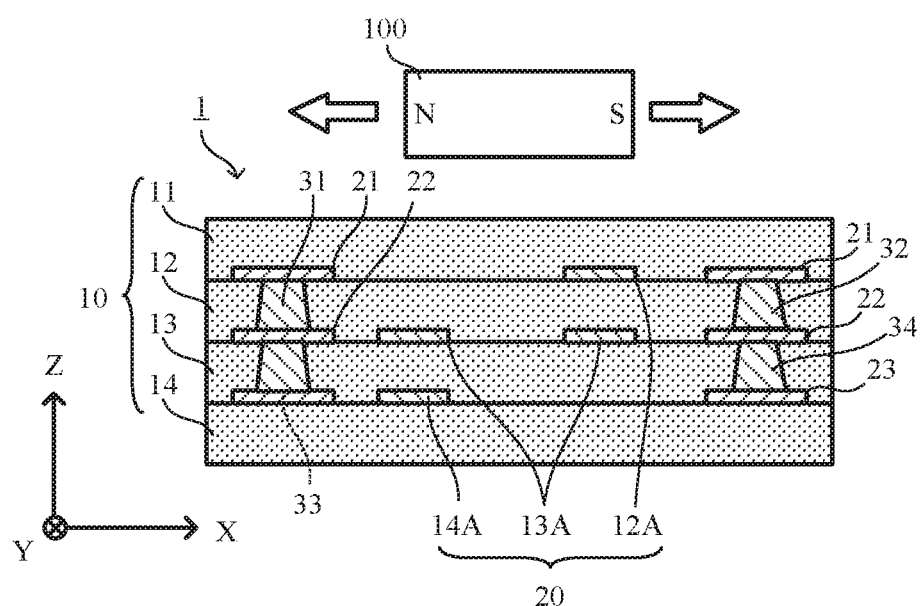
FIG. 2 is a sectional view of the electromagnet in FIG. 1 taken along a line II-II.

FIG. 1 is an exploded perspective view of an electromagnet 1 according to a first preferred embodiment of the present invention, and FIG. 2 is a sectional view of the electromagnet 1 in FIG. 1 taken along a line II-II.

The electromagnet 1 includes a stacked body 10 formed preferably by integrally stacking insulating base material layers 11, 12, 13, and 14. Each of the base material layers 11 to 14 is made of thermoplastic resin having flexibility, such as LCP resin (liquid crystal polymer resin). The stacked body 10 is formed preferably by heat-sealing the base material layers 11 to 14 to one another by hot pressing.

A coil 20 is located on the stacked body 10. LCP resin has lower dielectric constant than epoxy resin or ceramics. Therefore, the use of LCP resin to the base material layers 11 to 14 decreases line-to-line capacitance of the coil 20, and further, enables the formation of the coil 20 at relatively low temperature. In addition, because of low magnetic permeability of the LCP resin, repulsive force generated between windings of the coil 20 becomes low. Further, due to flexibility of the LCP resin, the stacked body 10 is difficult to crack.

Examples of the thermoplastic resin include PEEK (polyether ether ketone), PEI (polyether imide), PPS (polyphenylene sulfide), and PI (polyimide). These materials may be used instead of the liquid crystal polymer resin. The stacked body 10 may include a base material layer made of low-melting-point thermosetting resin, or may not include a base material layer made of thermoplastic resin.

Although the stacked body 10 preferably includes a plurality of base material layers 11 to 14, it may include only one base material layer. The stacked body 10 is one example of a "base".

Hereinafter, the planar direction of the base material layers 11 to 14 is defined as X-Y direction, and the stacking direction of the base material layers 11 to 14 is defined as a Z direction. The coil 20 is provided on the stacked body 10 with the Z direction being defined as a coil winding axis.

Terminal electrodes 11A and 11B are provided on one main surface (one of a front surface and a back surface) of the base material layer 11. The terminal electrodes 11A and 11B are input/output terminals of the coil 20.

Each of in-plane coil conductors 12A, 13A, and 14A is provided on one main surface (one of a front surface and a back surface) of each of the base material layers 12 to 14. The in-plane coil conductors 12A, 13A, and 14A are one examples of a "winding-shaped conductive pattern". An interlayer connection conductor indicated by a broken line in the figure is provided on each of the base material layers 12 to 14. The in-plane coil conductors 12A, 13A, and 14A are connected to one another with the interlayer connection conductors, such that the coil 20 is arranged over a plurality of layers. More specifically, one ends of the in-plane coil conductors 12A and 13A are connected to each other. One ends of the in-plane coil conductors 13A and 14A are also connected to each other.

As described above, the coil 20 includes the in-plane coil conductors 12A, 13A, and 14A, and the interlayer connection conductors. One end of the in-plane coil conductor 12A, which is a first end of the coil 20, is connected to the terminal electrode 11A with the interlayer connection conductor provided on the base material layer 11. One end of the in-plane coil conductor 14A, which is a second end of the coil 20, is connected to the terminal electrode 11B with the interlayer connection conductors provided on the base material layers 11 to 13. In this way, the coil 20 is disposed over a plurality of base material layers 11 to 14 so as to extend while winding around toward the direction away from the base material layer 11, on which the terminal electrodes 11A and 11B are provided, with the Z direction defined as the coil winding axis.

Dummy patterns 21, 22, and 23 are respectively provided on the base material layers 12 to 14. The dummy patterns 21 to 23 are provided on the same main surfaces of the respective base material layers 12 to 14 as the main surfaces on which the in-plane coil conductors 12A, 13A, and 14A are located.

The dummy pattern 21 is preferably loop-shaped along an edge of the base material layer 12 such that the in-plane coil conductor 12A is located inside the loop. The dummy pattern 22 is preferably loop-shaped along an edge of the base material layer 13 such that the in-plane coil conductor 13A is located inside the loop. The dummy pattern 23 is preferably loop-shaped along an edge of the base material layer 14 such that the in-plane coil conductor 14A is located inside the loop.

The dummy patterns 21 to 23 are preferably located at a position where they overlap with each other in the Z direction. Interlayer connection conductors 31, 32, 33, and 34 are provided on the base material layers 12 and 13. The dummy patterns 21 and are connected to each other with the interlayer connection conductors 31 and 32. The dummy patterns 22 and 23 are connected to each other with the interlayer connection conductors 33 and 34. These dummy patterns 21 to 23 and the interlayer connection conductors 31 to 34 are electrically isolated from other elements including the coil 20. As described later in detail, these dummy patterns 21 to 23 and the interlayer connection conductors 31 to define and function as a magnetic field shield for the magnetic field generated from the coil 20 upon the change in a current flowing through the coil 20, thus increasing the intensity of the magnetic field in the Z direction.

Each of the dummy patterns 21 to 23 may be provided on the other main surface opposite to the main surface on which each of the in-plane coil conductors 12A, 13A, and 14A is provided. The dummy patterns 21 to 23 may not necessarily be provided on each of the base material layers 12 to 14. For example, the dummy pattern may be provided on only the in-plane coil conductor 12A. It is only necessary that the dummy patterns 21 to 23 are located outside of the coil 20 in a plan view, and they may be provided on a base material layer different from the base material layers 12 to 14 on which the in-plane coil conductors 12A, 13A, and 14A are located. For example, another base material layer may be stacked between the base material layers 11 and 12, and a dummy pattern may be provided on this base material layer.

The number and position of the interlayer connection conductors connecting the dummy patterns 21 to 23 are not particularly limited. For example, the interlayer connection conductor may be provided at only one position of the base material layer 12 for connecting the dummy patterns 21 and 22. Alternatively, the interlayer connection conductors may be provided at three or more positions of the base material layer 12 for connecting the dummy patterns 21 and 22. In addition, the dummy patterns 21 to 23 may not be connected with the interlayer connection conductor, but they may be independent of one another. Further, the interlayer connection conductors 31 to 34 may be connected to only one of the dummy patterns 21 to 23. For example, the interlayer connection conductor 31 may be connected to only the dummy pattern 21 without being connected to the dummy pattern 22.

A non-limiting example of a production method of this electromagnet 1 is as described below.

Firstly, a copper foil is attached to one surface of a resin sheet. Alternatively, a sheet with copper attached to one surface is prepared. A resist film is patterned on the copper foil according to the terminal electrodes 11A and 11B, the in-plane coil conductors 12A to 14A, and the dummy patterns 21 to 23 to be formed. An etching is performed to form each pattern, and then, the resist film is removed. Thereafter, each position where the interlayer connection conductor is to be formed is irradiated with laser light from the other surface (on which the copper foil is not attached) of each of the base material layers 11 to 13 to form a hole. A conductive paste containing Su, Cu, Ni, Ag, etc. is filled in this hole. Thus, the base material layers 11 to 14 are formed.

The formed base material layers 11 to 14 are stacked. In this case, each of the base material layers 11 to 14 is stacked on the main surface on which each pattern is formed. For example, the base material layer 13 is stacked on the base material layer 14 such that the contact surface with the base material layer 14 becomes the main surface on which the in-plane coil conductor 13A is not formed. The base material layer 12 is stacked on the base material layer 13 such that the contact surface with the base material layer 13 becomes the main surface on which the in-plane coil conductor 12A is not formed.

A heat and pressure treatment (hot press) is applied to the stacked base material layers 11 to 14 to bond these layers. The base material layers 11 to 14 are thermoplastic as described above, so that an adhesive agent does not need to be used. Further, the insulating base material layer is a base material layer made of flexible resin, and this prevents damage (crack) upon curing. Thus, the electromagnet 1 is produced.

A permanent magnet 100 is provided just above the coil 20, such that the electromagnet 1 thus configured is preferably used as a so-called voice coil motor, for example. The portion just above the coil 20 is the position which is opposite to the end of the stacked body 10 at the side of the base material layer in the Z direction, and overlapped with the opening of the coil 20 in a plan view. The permanent magnet 100 includes an N pole and an S pole located along the X direction, and is capable of reciprocating along the X direction.

When a current flows through the coil 20 in the electromagnet 1, a magnetic field occurs. The permanent magnet 100 disposed just above the electromagnet 1 reciprocates along the X direction as indicated by arrows in the figure by electromagnetic force (magnetic attractive force and magnetic repulsive force) caused by the magnetic field. Specifically, the reciprocating motion of the permanent magnet 100 is changed according to the direction and power of electromagnetic force.

For example, in the case where a current flows through the coil 20 in the direction from the terminal electrode 11A to the terminal electrode 11B, the coil 20 includes an N pole at the side of the base material layer 11 and an S pole at the side of the base material layer 14. In this case, the S-pole end of the permanent magnet 100 is displaced with the magnetic attractive force toward the portion just above the coil 20 along the X-axis direction. When the value of the current flowing through the coil 20 is changed to increase (or decrease) the intensity of the magnetic field in this case, the magnetic attractive force is also increased (or decreased) to raise (or reduce) the displacement speed of the permanent magnet 100.

When the current flowing through the coil 20 is reversed, the polarity of the coil 20 is reversed, and the displacement direction of the permanent magnet 100 is also reversed. More specifically, when the current flows through the coil 20 in the direction from the terminal electrode 11B to the terminal electrode 11A, the coil 20 includes an S pole at the side of the base material layer 11 and an N pole at the side of the base material layer 14. In this case, the N-pole end of the permanent magnet 100 is displaced toward the portion just above the coil 20 along the X-axis direction with the magnetic attractive force.

In this way, the displacement speed and displacement direction of the permanent magnet 100 in the X direction is changed by changing the level and the direction of the current flowing through the coil 20. Accordingly, a voice coil motor with high responsiveness preferably is implemented by enhancing a response of the permanent magnet 100 to the displacement speed and the displacement direction upon the change in the current. The response of the permanent magnet 100 is enhanced by increasing the electromagnetic force upon the change in the current.

In the present preferred embodiment, the electromagnet 1 includes the dummy patterns 21 to 23. The dummy patterns 21 to 23 are provided outside of the coil 20. With this, the dummy patterns 21 to 23 prevent the spread of the magnetic field generated from the coil 20 in the X direction upon the change in the current. Accordingly, the magnetic field just above the coil 20 in the Z direction where the dummy patterns 21 to 23 are not provided is able to be increased. Upon the change in the current, the magnetic field just above the coil 20 is increased, so that the electromagnetic force is also increased as described above. Accordingly, the response of the permanent magnet 100 is enhanced. When the current value becomes constant, the magnetic flux generated from the coil 20 passes through the dummy patterns 21 to 23. In other words, when the current value becomes constant, there is little difference in the intensity of the magnetic field due to the presence/absence of the dummy patterns 21 to 23.

The magnetic field generated from the electromagnet 1 will be described below.

Figure 3:
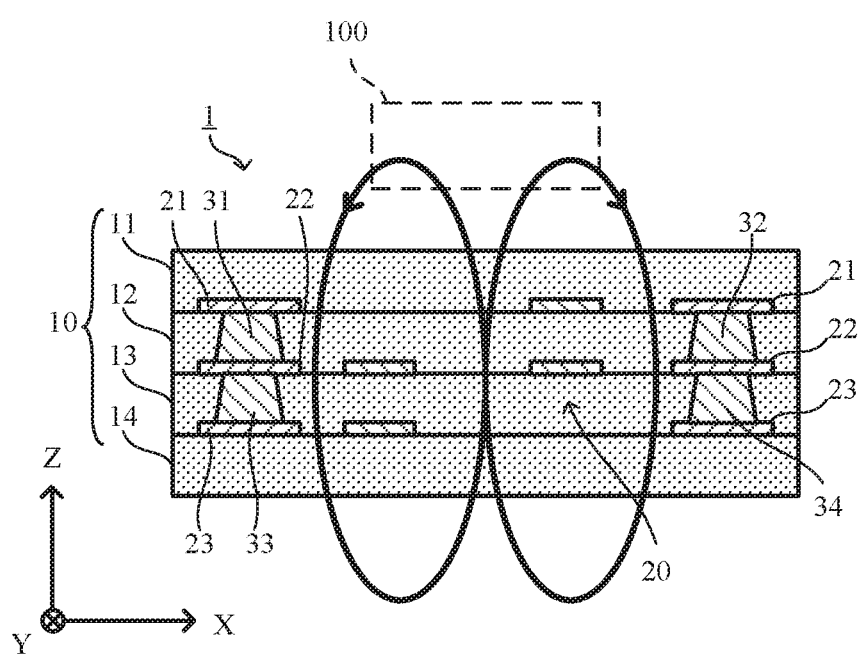
FIG. 3 is a view illustrating a magnetic field generated from the electromagnet.
Figure 4:
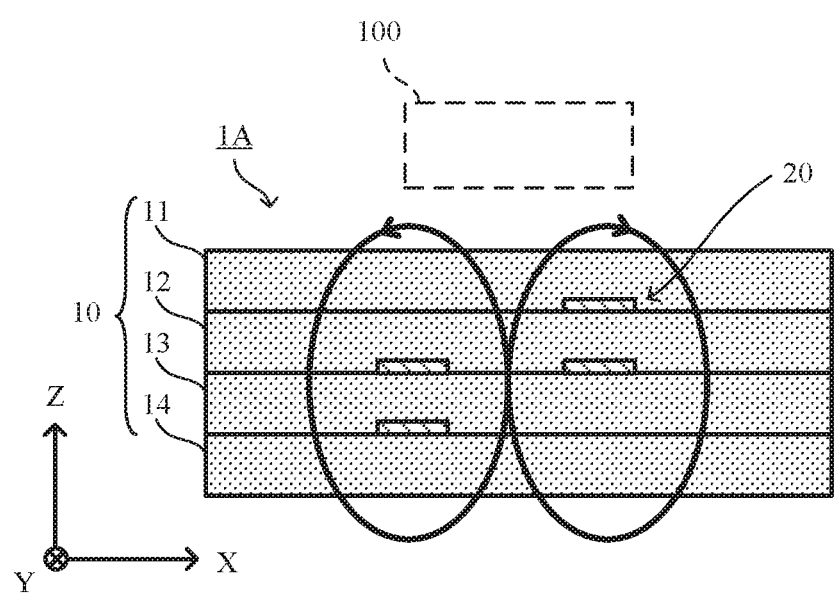
FIG. 4 is a view illustrating a magnetic field generated from an electromagnet having no dummy pattern.

FIG. 3 is a view illustrating the magnetic field generated from the electromagnet 1. FIG. 4 is a view illustrating a magnetic field generated from an electromagnet 1A having no dummy pattern. FIG. 4 is a view for comparison of FIG. 3. Similar to the electromagnet 1, the electromagnet 1A illustrated in FIG. 4 has a coil 20 located on a stacked body 10, but does not have a dummy pattern. Loop-shaped arrows illustrated in FIGS. 3 and 4 indicate the magnetic field generated on the coil 20 through which a current flows.

When a current flows through the coils 20 in the electromagnets 1 and 1A in one direction, a loop-shaped magnetic field in the direction from the inside to the outside of the coil is generated. In the electromagnet 1 including the dummy patterns 21 to 23 at the outside of the coil 20, the generated magnetic field passes between the coil 20 and the dummy patterns 21 to 23. In other words, the dummy patterns 21 to 23 define and function as a magnetic field shield for preventing the spread of the generated magnetic field. On the other hand, in the electromagnet 1A having no dummy patterns 21 to 23, the generated magnetic field spreads in the X direction, compared to the electromagnet 1.

With this, upon the change in the current, the electromagnet 1 including the dummy patterns 21 to 23 has a higher magnetic flux density at a portion just above the coil 20 in the Z direction than the electromagnet 1A having no dummy patterns, and therefore, the magnetic field is increased. This increases the electromagnetic force just above the coil 20.

Figure 5:
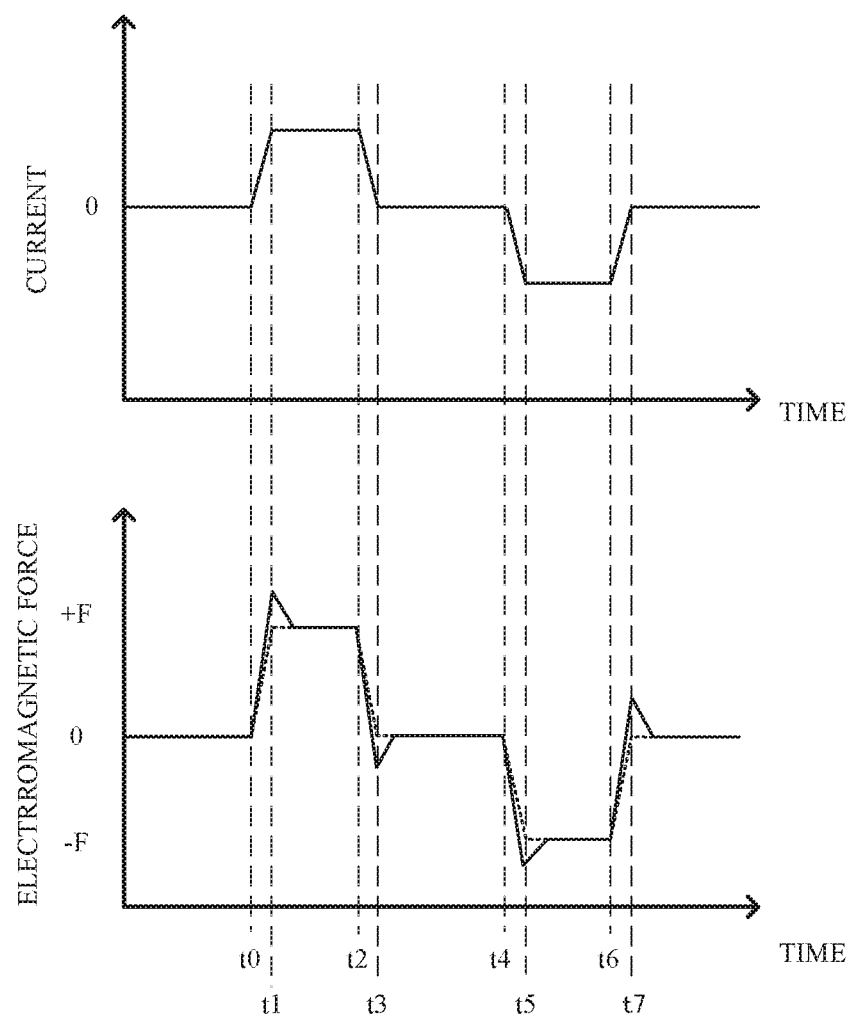
FIG. 5 is a graph illustrating a relationship between a current and electromagnetic force to a time.

FIG. 5 is a graph illustrating the relationship between a current and electromagnetic force to a time.

In the upper graph in FIG. 5, a vertical axis indicates a current, and a horizontal axis indicates a time. This graph illustrates that a value and a direction of a current flowing through the coil 20 are changed with time. In this graph, the flowing direction of the current is opposite between the case where the current value is plus and the case where the current value is minus. For example, the flowing direction of the current flowing through the coil 20 from times t0 to t3 and the flowing direction of the current flowing through the coil 20 from times t4 to t7 are opposite to each other. The current flowing through the coil 20 increases from times t0 to t1 and times t6 to t7, the current becomes constant from times t1 to t2, times t3 to t4, and times t5 to t6, and the current decreases from times t2 to t3 and times t4 to t5.

In the lower graph in FIG. 5, a vertical axis indicates electromagnetic force, and a horizontal axis indicates a time. This graph illustrates that electromagnetic force is changed according to a value and a direction of a current flowing through the coil 20. The direction in which the electromagnetic force is exerted in the X direction is opposite between the case where the current value is plus and the case where the current value is minus. For example, this graph illustrates that the electromagnetic force is exerted in the opposite direction in the X direction between the times t0 to t3 and the times t4 to t7.

In the lower graph in FIG. 5, the change in electromagnetic force in the case where the dummy pattern is not provided is indicated by a broken line, and the change in electromagnetic force in the case where the dummy patterns 21 to are provided is indicated by a solid line for comparison. Comparing these two changes, the electromagnetic force in the configuration having the dummy patterns 21 to 23 becomes sharply higher than the electromagnetic force in the configuration with no dummy patterns from the times t0 to t1, from the times t2 to t3, from the times t4 to t5, and from the times t6 to t7. In addition, the electromagnetic force in the configuration with the dummy patterns 21 to 23 is larger than the electromagnetic force in the configuration with no dummy patterns at times t1, t3, t5, and t7 at which the current is changed.

Specifically, in the configuration including the dummy patterns 21 to 23, the electromagnetic force exerted to the permanent magnet 100 upon the change in the current is larger than that in the configuration without having the dummy patterns 21 to 23. Accordingly, the configuration including the dummy patterns 21 to 23 enhances responsiveness of the permanent magnet 100.

For example, from the times t0 to t3, the electromagnetic force becomes sharply higher in the configuration having the dummy patterns 21 to 23 than that in the configuration with no dummy patterns. With this, the permanent magnet 100 is more rapidly displaced. At the time t3, the electromagnetic force in the configuration having no dummy patterns is zero, while the electromagnetic force in the configuration having the dummy patterns 21 to 23 is exerted in the opposite direction of the electromagnetic force generated from the times t0 to t3. Accordingly, in the configuration having the dummy patterns 21 to 23, the electromagnetic force in the direction opposite to the displacement direction is exerted at the time t3 to the permanent magnet 100 displaced in the X direction, such that the displacement of the permanent magnet 100 is able to be instantaneously stopped.

As described above, the electromagnet 1 including the dummy patterns 21 to 23 increases electromagnetic force upon the change in the current, thus enhancing responsiveness of the permanent magnet 100 upon the change in the current. This configuration provides a voice coil motor having excellent responsiveness.

The preferable positional relationship between the coil 20 and the dummy patterns 21 to 23 to increase electromagnetic force of the electromagnet 1 will be described below.

Figure 6:
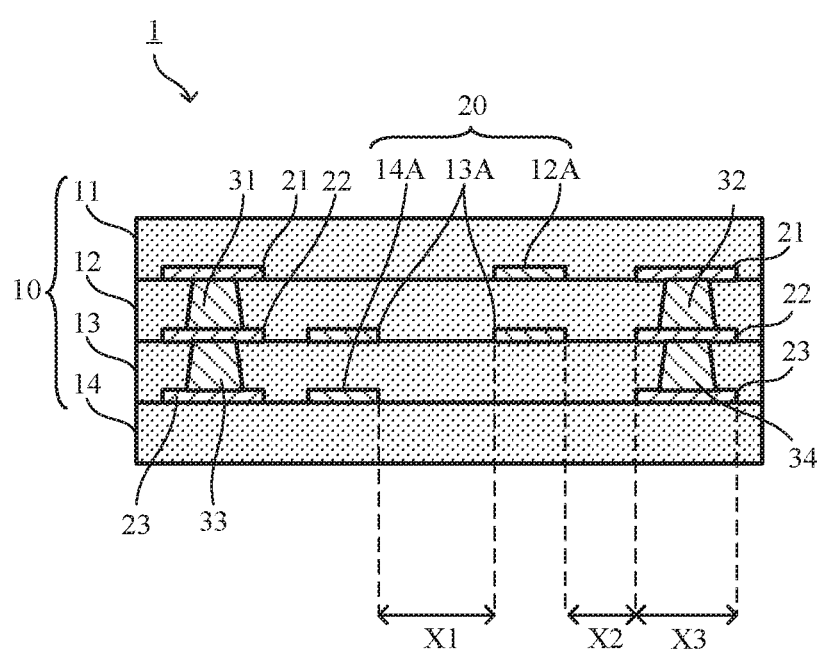
FIG. 6 is a view for describing a positional relationship between a coil conductor and a dummy pattern.

FIG. 6 is a view for describing a positional relationship between the coil 20 and the dummy patterns 21 to 23. In this figure, the inner diameter of the coil 20 is defined as X1, the distance between the coil 20 and the dummy patterns 21 to 23 is defined as X2, and the pattern width of each of the dummy patterns 21 to 23 is defined as X3.

The distance X2 between the coil 20 and the dummy patterns 21 to 23 is preferably smaller, and X2 X1 is preferably satisfied. The width X3 is preferably equal to or larger than a half of the inner diameter X1 (the distance from the center of the opening of the coil to the inner edge).

The voice coil motor having the electromagnet 1 according to the present preferred embodiment is preferably used as a voice coil motor for a camera shake correction, for example. A camera module including the voice coil motor for a camera shake correction will be described below.

Figure 7:
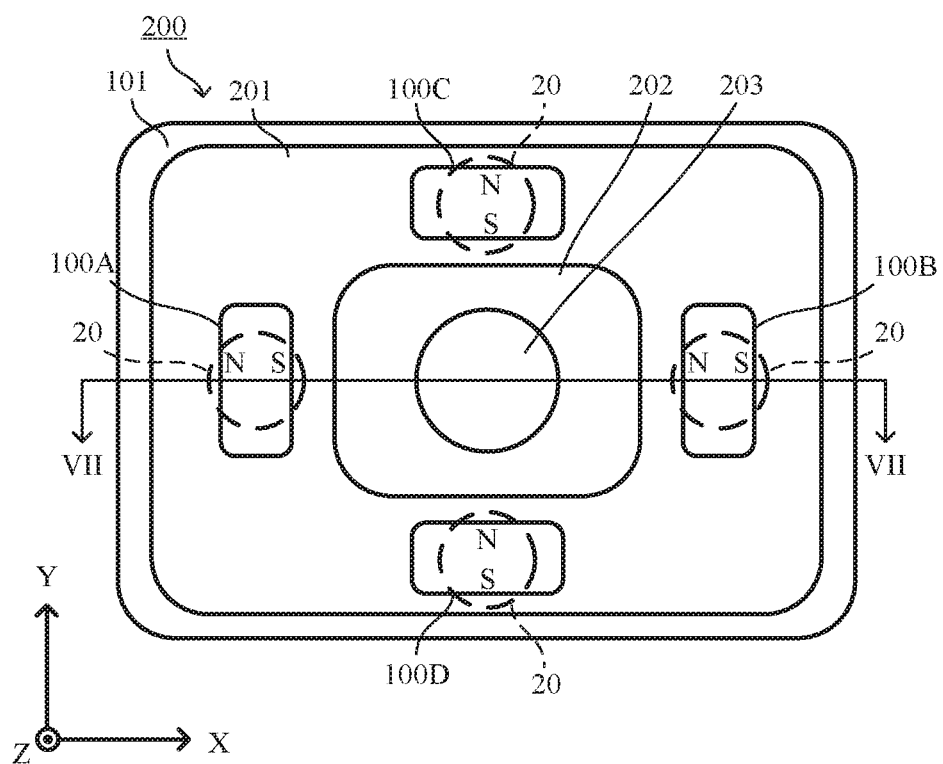
FIG. 7 illustrates a plan view of a camera module provided with the electromagnet according to a preferred embodiment of the present invention, and a sectional view taken along a line VII-VII.
Figure 7:
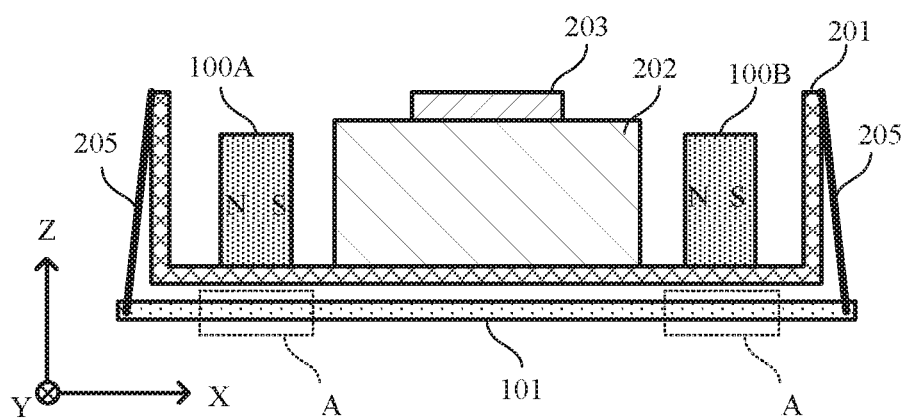

FIG. 7 illustrates a plan view of a camera module 200 including the electromagnet 1 according to the present preferred embodiment, and a sectional view taken along a line VII-VII.

The camera module 200 includes a flexible substrate 101 and a frame 201. The frame 201 includes a lens holder 202 provided at the center of a flat plate, and this lens holder 202 holds a camera lens 203. Permanent magnets 100A, 100B, 100C, and 100D are provided on the flat plate of the frame 201 so as to surround the lens holder 202 on all four sides.

The permanent magnets 100A and 100B are provided along the X direction across the lens holder 202. Each of the permanent magnets 100A and 100B includes an N pole and an S pole along the X direction. The permanent magnets 100C and 100D are provided along the Y direction across the lens holder 202. Each of the permanent magnets 100C and 100D includes an N pole and an S pole along the Y direction.

The frame 201 covers the permanent magnets 100A to 100D and the lens holder 202 and the like. However, FIG. 7 is a perspective view in which the permanent magnets 100A to 100D and the like covered by the frame 201 are visible.

The flexible substrate 101 is provided below the frame 201 with a gap (e.g., 500 μm or less) between the frame 201 and the flexible substrate 101. The frame 201 is displaceable in the X-Y plane. The flexible substrate 101 and the frame 201 are connected with a wire 205, and the wire 205 defines and functions as a stopper of the frame 201 which is displaceable in the X-Y plane.

The flexible substrate 101 is formed preferably by stacking base material layers made of flexible thermoplastic resin. The flexible substrate 101 has the configuration of the electromagnet 1 according to the present preferred embodiment provided on regions A corresponding to the permanent magnets 100A to 100D in the Z direction. When a current flows through the coil conductors of the electromagnets 1 formed below the permanent magnets 100A and 100B, the frame 201 is displaced in the X direction. When a current flows through the coil conductors of the electromagnets 1 below the permanent magnets 100C and 100D, the frame 201 is displaced in the Y direction.

Figure 8A:
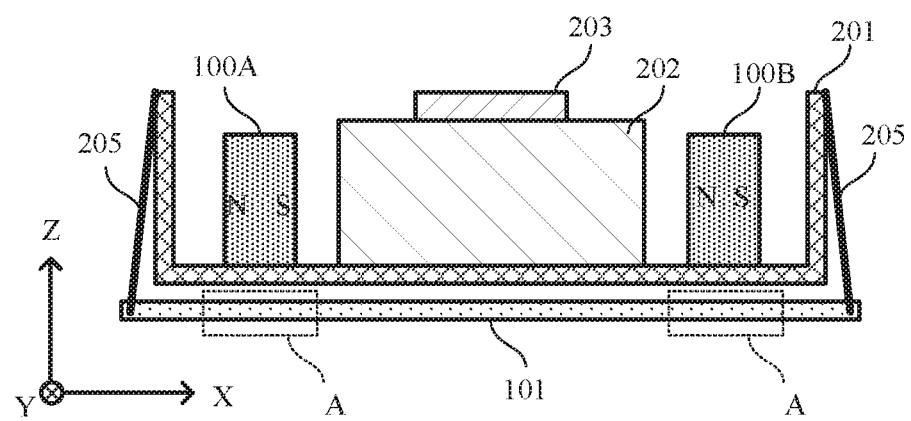
FIGS. 8A and 8B are views illustrating an example in which a frame is displaced in an X direction.
Figure 8B:
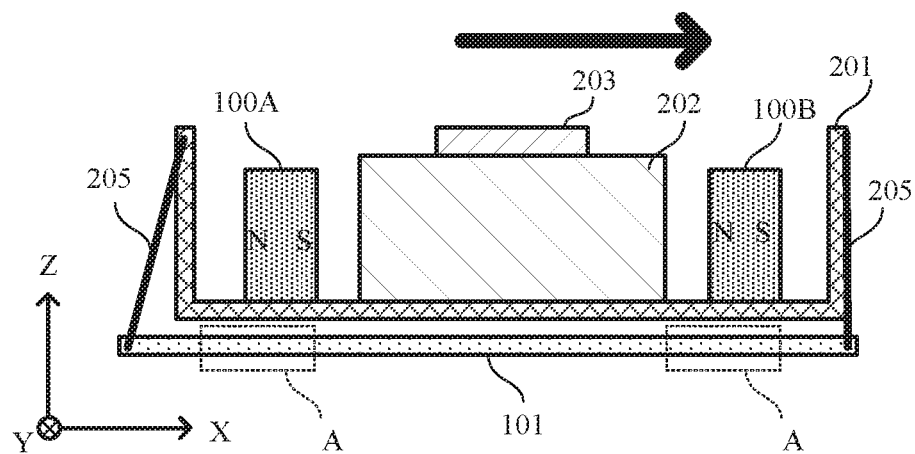

FIGS. 8A and 8B are views illustrating examples in which the frame 201 is displaced in the X direction. For example, when a current flows through the coil conductors of the electromagnets below the permanent magnets 100A and 100B with the state illustrated in FIG. 8A, the frame 201, and the lens holder 202 and the camera lens 203 provided to the frame 201 are displaced in the X direction (FIG. 8B). Although not illustrated, when a current flows through the coil conductors of the electromagnets below the permanent magnets 100C and 100D, the frame 201, and the lens holder 202 and the camera lens 203 provided to the frame 201 are displaced in the Y direction. With this, the camera lens 203 can be displaced in the X-Y direction, such that a so-called camera shake correction is provided.

The electromagnet 1 according to the first preferred embodiment has been described above. The number of the base material layers to be stacked can appropriately be changed. Modifications of the electromagnet 1 according to the first preferred embodiment will be described below.

Figure 9:
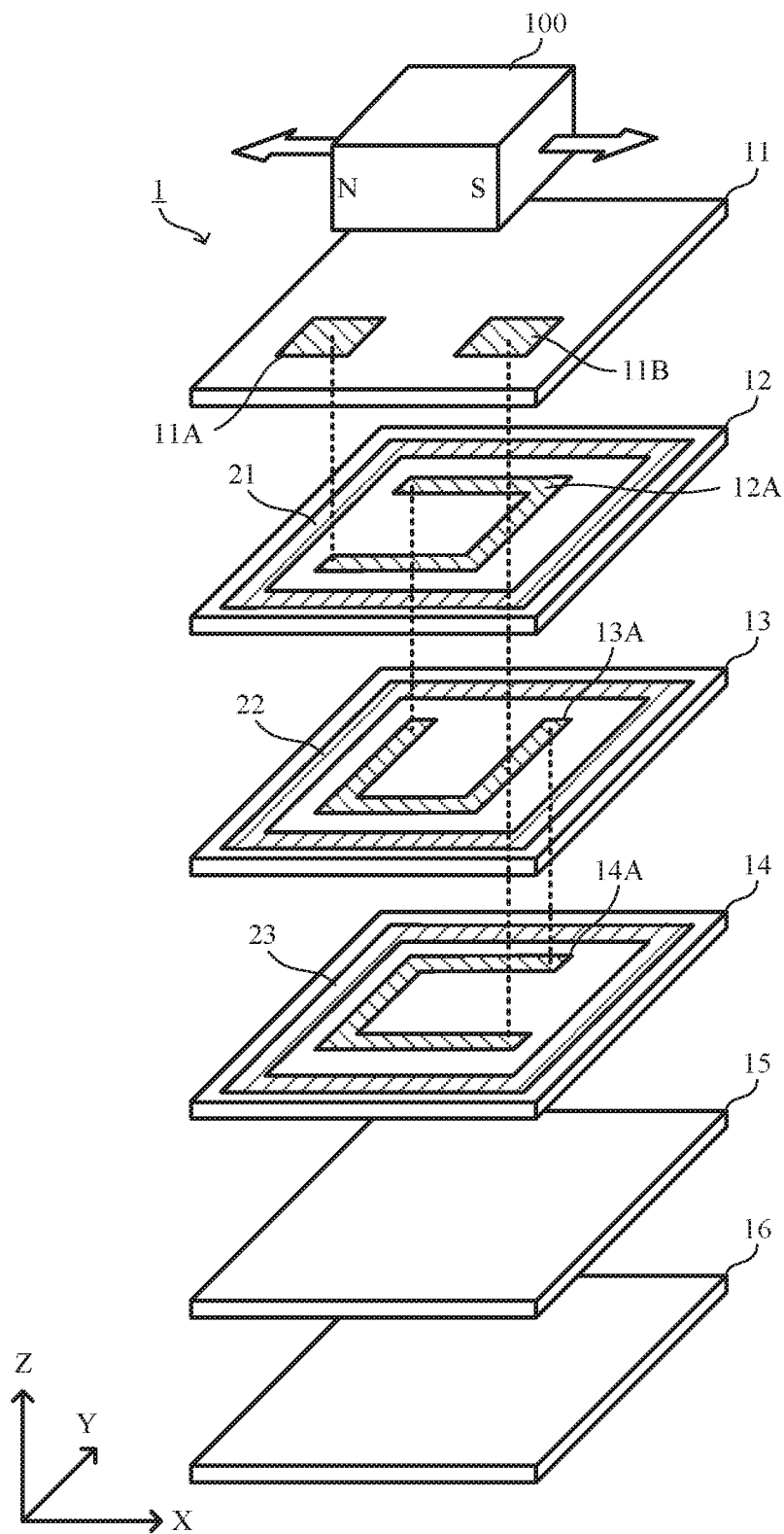
FIG. 9 is a perspective view of an electromagnet different from the electromagnet according to a first preferred embodiment of the present invention.

FIG. 9 is a perspective view illustrating an electromagnet different from the electromagnet 1 according to the first preferred embodiment.

In this example, the electromagnet 1A is formed preferably by stacking base material layers 11 to 16. Terminal electrodes 11A and 11B, in-plane coil conductors 12A, 13A, and 14A, and dummy patterns 21 to 23 are provided on one main surfaces of the base material layers 11 to 14. Base material layers 15 and 16 are further stacked on the base material layer 14. An in-plane coil conductor is not provided on any of the main surfaces of the base material layers 15 and 16.

Specifically, in this example, the coil conductor including the in-plane coil conductors 12A, 13A, and 14A are located close to the side of the base material layer 11 among the base material layers 11 to 16. This configuration allows the coil conductor to be close to the permanent magnet 100, thus increasing an influence of the electromagnet to the permanent magnet 100. Accordingly, the responsiveness of the permanent magnet 100 to the displacement in the X direction is enhanced.

Second Preferred Embodiment

An electromagnet according to a second preferred embodiment of the present invention will be described below. The second preferred embodiment is different from the first preferred embodiment in that dummy patterns are provided only for the displacement direction of the permanent magnet disposed just above the electromagnet.

Figure 10:
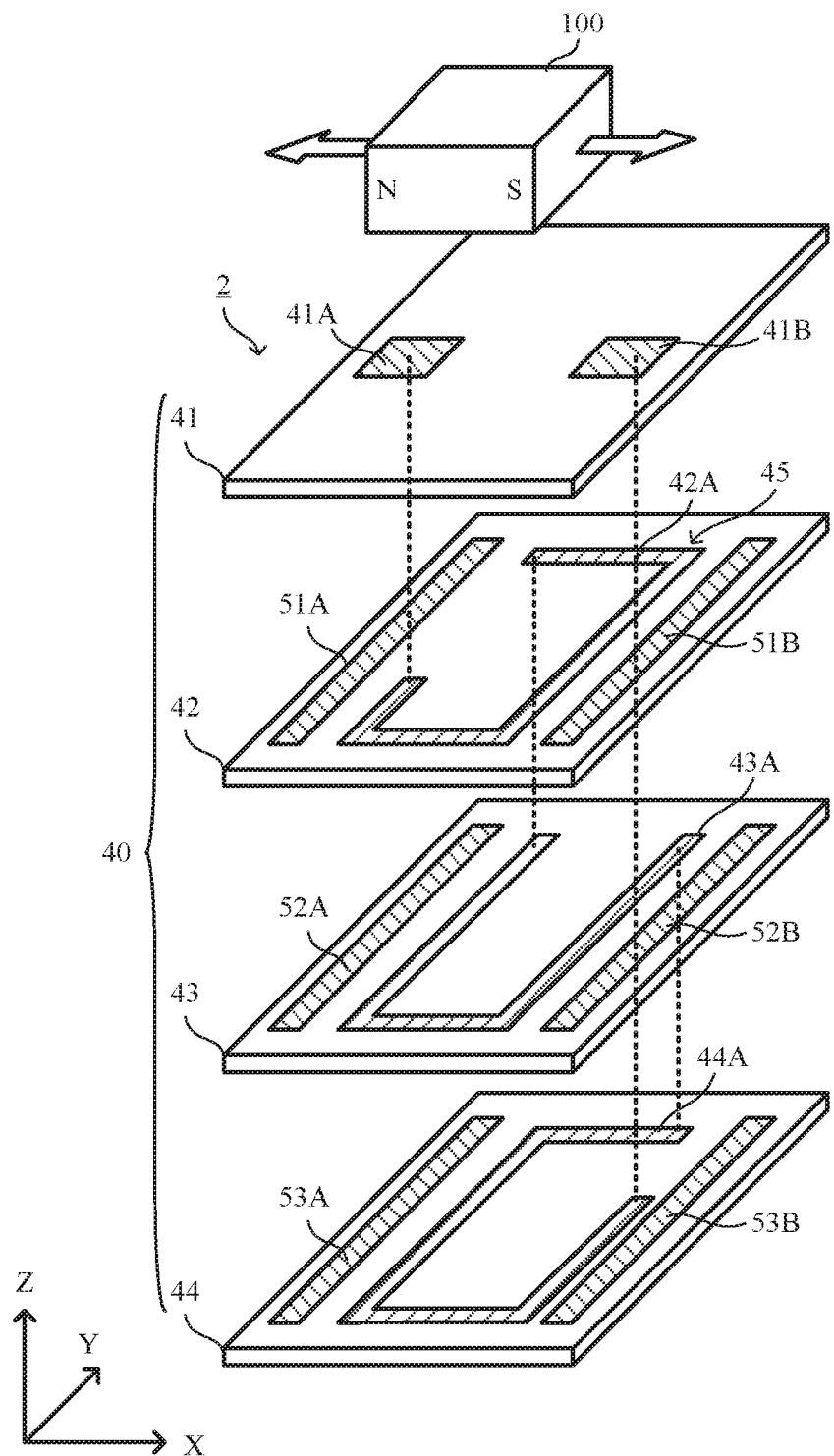
FIG. 10 is an exploded perspective view of an electromagnet according to a second preferred embodiment of the present invention.

FIG. 10 is an exploded perspective view of an electromagnet according to the second preferred embodiment.

Similar to the first preferred embodiment, the electromagnet 2 includes a stacked body 40 formed preferably by integrally stacking insulating base material layers 41, 42, 43, and 44. The base material layers 41 to 44 are one example of an insulating substrate according to a preferred embodiment of the present invention. The base material layers 41 to 44 are made of thermoplastic resin having flexibility, such as LCP resin. The stacked body 40 is formed preferably by heat-sealing the base material layers 41 to 44 to one another by hot pressing.

Terminal electrodes 41A and 41B are provided on one main surface (one of a front surface and a back surface) of the base material layer 41.

Each of in-plane coil conductors 42A, 43A, and 44A is provided on one main surface (one of a front surface and a back surface) of each of the base material layers 42 to 44. An interlayer connection conductor indicated by a broken line in the figure is provided on each of the base material layers 42 to 44. The in-plane coil conductors 42A, 43A, and 44A are connected to one another with the interlayer connection conductors, such that a coil 45 over a plurality of layers is provided. More specifically, one ends of the in-plane coil conductors 42A and 43A are connected to each other. One ends of the in-plane coil conductors 43A and 44A are also connected to each other.

As described above, the coil 45 includes the in-plane coil conductors 42A to 44A, and the interlayer connection conductors. One end of the in-plane coil conductor 42A, which is a first end of the coil 45, is connected to the terminal electrode 41A with the interlayer connection conductor provided on the base material layer 41. One end of the in-plane coil conductor 44A, which is a second end of the coil 45, is connected to the terminal electrode 41B with the interlayer connection conductors provided on the base material layers 41 to 43.

Dummy patterns 51A, 51B, 52A, 52B, 53A, and 53B are respectively provided on the base material layers 42 to 44. The dummy patterns 51A to 53B are provided on the same main surfaces of the respective base material layers 42 to 44 as the main surfaces on which the in-plane coil conductors 42A, 43A, and 44A are located.

The dummy patterns 51A and 51B extend along an edge of the base material layer 42 in the X direction so as to sandwich the in-plane coil conductor 42A. The dummy patterns 52A and 52B extend along an edge of the base material layer 43 in the X direction so as to sandwich the in-plane coil conductor 43A. The dummy patterns 53A and 53B extend along an edge of the base material layer 44 in the X direction so as to sandwich the in-plane coil conductor 44A. The dummy patterns 51A to 53B are electrically isolated from other elements including the coil 45.

A permanent magnet 100 displaceable in the X direction is disposed just above the electromagnet 2 thus configured. This permanent magnet 100 is displaced in the X direction by a magnetic field (electromagnetic force) from the electromagnet 2. The dummy patterns 51A to 53B define and function as a magnetic field shield for the magnetic field generated from the coil 45 upon a change in a current flowing through the coil 45, as in the first preferred embodiment. Thus, the dummy patterns 51A to 53B define and function as a magnetic field shield to increase the intensity of the magnetic field in the Z direction.

In this example, the dummy patterns 51A to 53B extend along the X direction, and they are not provided in the Y direction in which the permanent magnet 100 is not displaced. With this, the dummy patterns are able to be smaller than in the first preferred embodiment. Accordingly, the formation space of the dummy pattern is reduced, such that the sizes of the base material layers 41 to 44 are able to be decreased more.

Notably, the dummy patterns 51A to 53A and the dummy patterns 51B to 53B may be provided on overlapped positions in the Z direction, and as in the first preferred embodiment, the dummy patterns 51A to 53A may be connected with interlayer connection conductors located on the base material layers 42 and 43, and the dummy patterns 51B to 53B may be connected with interlayer connection conductors located on the base material layers 42 and 43.

Figure 11:
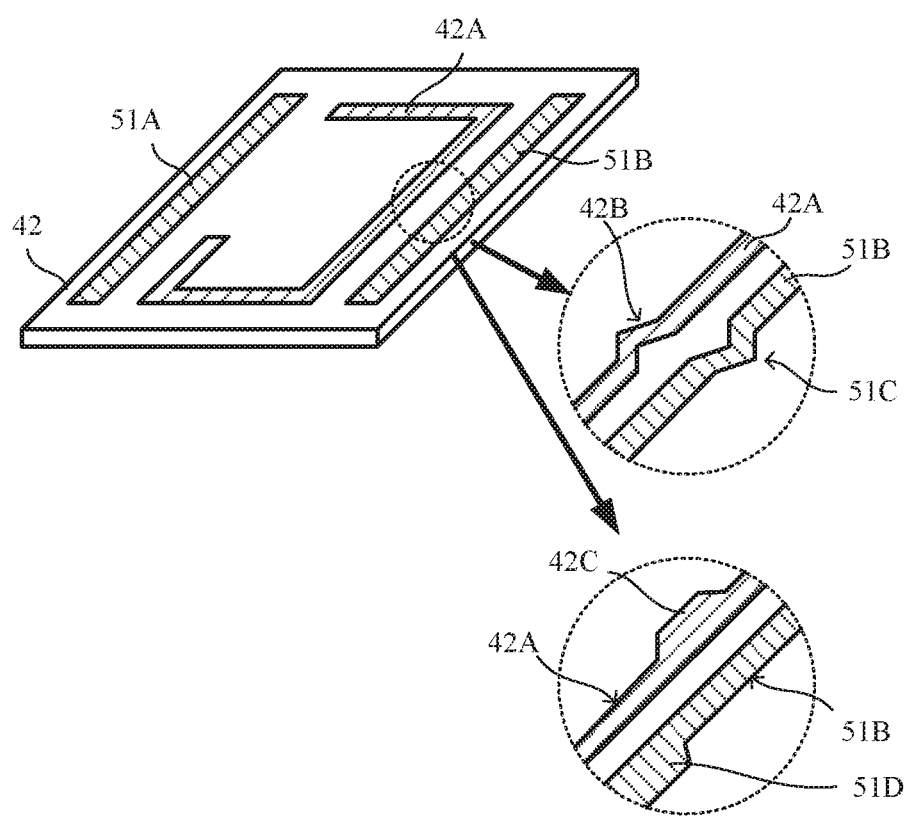
FIG. 11 is a view illustrating one example of an in-plane coil conductor and a dummy pattern, each including a stress distribution portion provided thereon.

A stress distribution portion may be provided on each of the in-plane coil conductors 42A, 43A, and 44A, each of the dummy patterns 51A to 53A, and each of the dummy patterns 51B to 53B for stress distribution of the base material layers 41 to 44. FIG. 11 is a view illustrating one example of an in-plane coil conductor and a dummy pattern including a stress distribution portion formed thereon. FIG. 11 illustrates the base material layer 42 in FIG. 10 as one example.

For example, the in-plane coil conductor 42A and the dummy pattern 51B preferably have a winding shape including a plurality of linear portions. Bent portions 42B and 51C which are bent may be provided on the linear portions thereof. The bent portion 42B of the in-plane coil conductor 42A is bent to project in the direction away from the adjacently disposed dummy pattern 51B. The bent portion 51C of the dummy pattern 51B is bent to project in the direction away from the adjacently disposed in-plane coil conductor 42A. The bent portions 42B and 51C may be bent to project in the direction close to the dummy pattern 51B and in the direction close to the in-plane coil conductor 42A, respectively. The in-plane coil conductor 42A and the dummy pattern 51B may include wide portions 42C and 51D, which are wider than the other portions in the direction perpendicular or substantially perpendicular to the direction in which the linear portions extend. The stress distribution portion may be provided on plural positions of the in-plane coil conductor and the dummy pattern, or on only one position.

The formation of the stress distribution portion distributes stress involved with a flow of resin upon a heat and pressure treatment with the base material layers 41 to 44 being stacked. This prevents the possibility in which, during the production process, the in-plane coil conductor and the dummy pattern tilt in the stacking direction with the flow of resin to be in contact with each other (short-circuited), and hence, the performance of the coil 45 cannot be obtained. This also prevents the possibility in which the in-plane coil conductor and the dummy pattern are twisted due to the twist of the base material layers 41 to 44 such that the in-plane coil conductor and the dummy pattern are short-circuited (in contact with each other) or damaged. A non-linear portion such as a corner (curved portion) of the in-plane coil conductor 42A is more difficult to tilt than the linear portion. Therefore, it is effective to form the stress distribution portion on the linear portion.

The stress distribution portion may be applied to the electromagnet 1 according to the first preferred embodiment.

Third Preferred Embodiment

Figure 12:
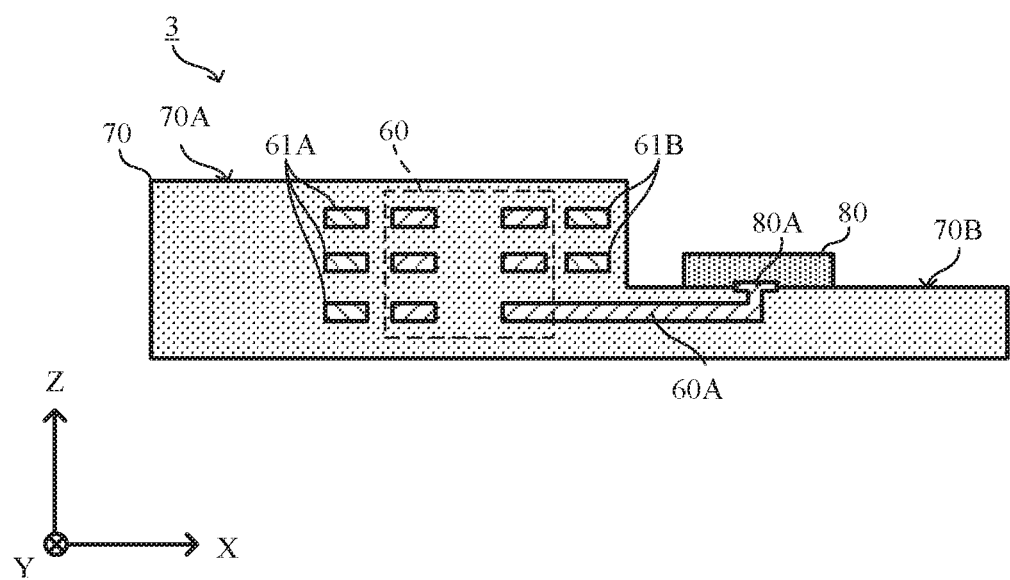
FIG. 12 is a front sectional view of an electromagnet according to a third preferred embodiment of the present invention.

FIG. 12 is a front sectional view of an electromagnet according to a third preferred embodiment of the present invention. In this preferred embodiment, an electromagnet 3 includes a stacked body 70. This stacked body 70 is formed preferably by integrally stacking a plurality of insulating base material layers. The base material layer is made of flexible thermoplastic resin such as LCP resin. The stacked body 70 is formed preferably by hot pressing the base material layers.

The stacked body 70 includes a first main surface 70A and a second main surface 70B on the same side of the edge in the Z direction, the first main surface 70A and the second main surface 70B having different heights in the Z direction. In other words, the stacked body 70 includes a step. A coil 60 is located at the side of the first main surface 70A. Similar to the first and second preferred embodiments, the coil 60 includes an in-plane coil conductor located on one main surface of each of the base material layers in the stacked body 70, in which the in-plane coil conductors are connected to one another with interlayer connection conductors.

A terminal 80A that mounts an external element 80 is provided on the second main surface 70B of the stacked body 70. The coil 60 is connected to the external element 80 at its one end via a connection conductor 60A.

Dummy patterns 61A and 61B are located outside of the coil 60. The dummy pattern 61B is provided at the step of the stacked body 70 and close to the side of the second main surface 70B. If the dummy pattern 61B is not provided, a boundary between the first main surface 70A and the second main surface 70B is made of only resin. Therefore, the stacked body may be damaged upon the integral formation. In view of this, the dummy pattern 61B is located inside, and this stabilizes the shape of the step, as well as increases the intensity of the electric field of the electromagnet 3.

Even when the first main surface 70A becomes a mounting surface on which other elements are mounted, the first main surface 70A is able to be made flat by stabilizing the shape of the step. This prevents problems in which other elements cannot be mounted or other elements are mounted as being floated from the first main surface 70A.

Fourth Preferred Embodiment

Figure 13:
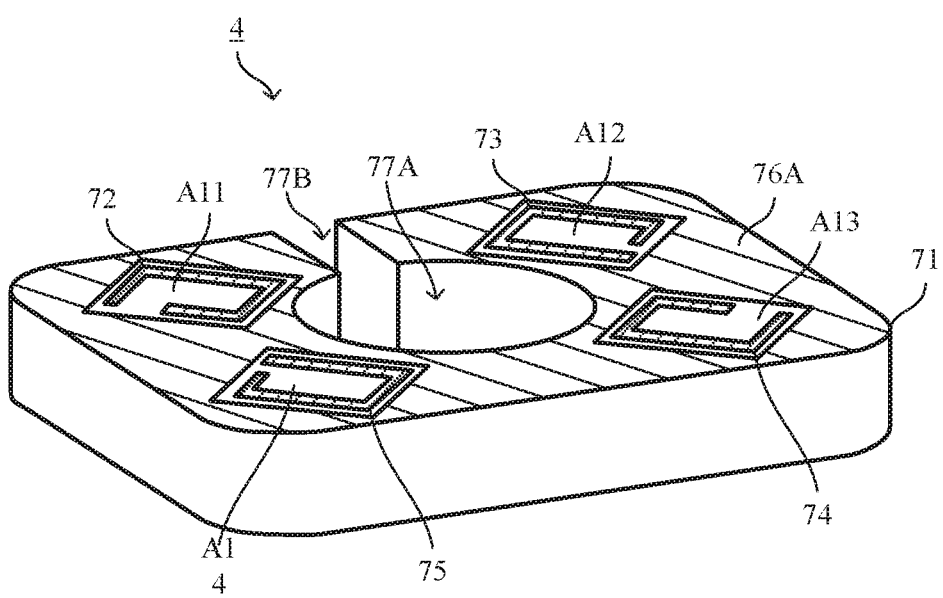
FIG. 13 is a perspective view of an electromagnet according to a fourth preferred embodiment of the present invention.
Figure 14:
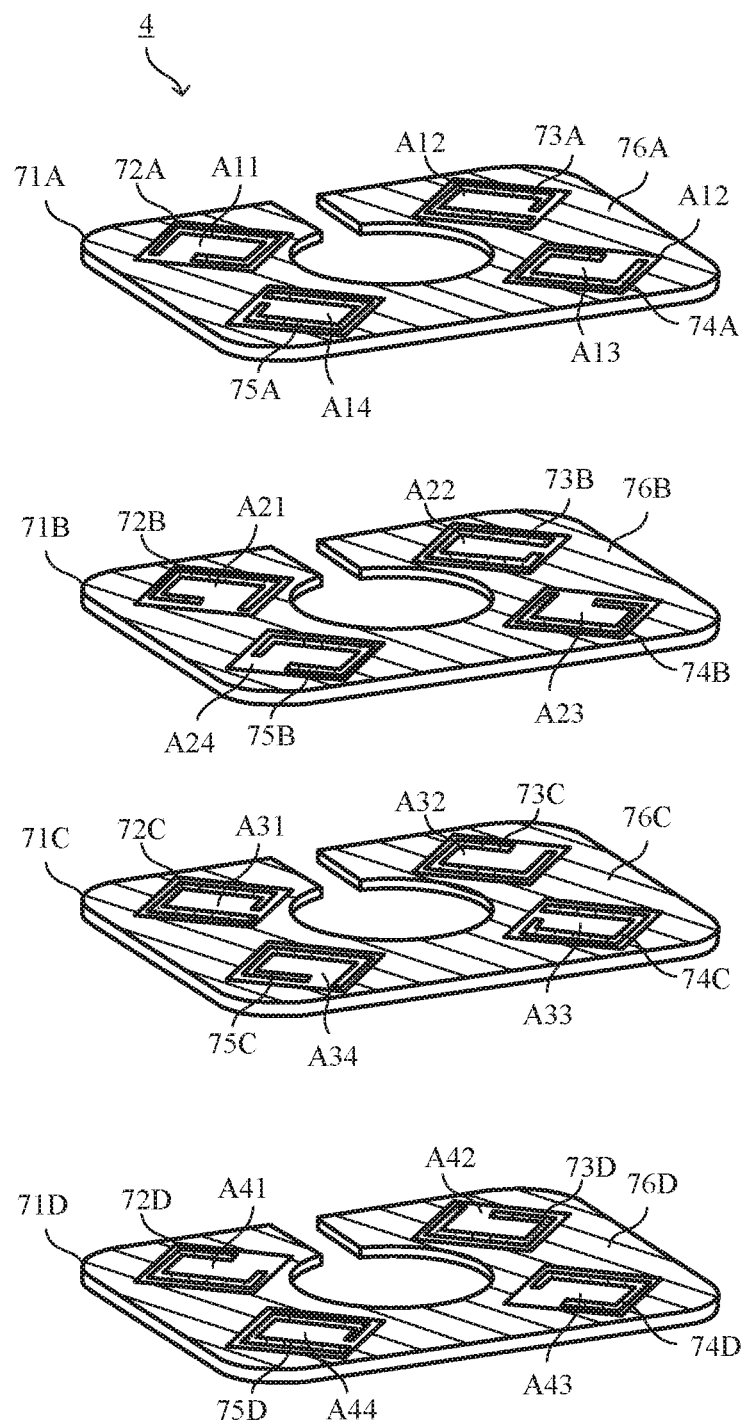
FIG. 14 is an exploded view of an electromagnet according to the fourth preferred embodiment of the present invention.

FIG. 13 is a perspective view of an electromagnet 4 according to a fourth preferred embodiment of the present invention. FIG. 14 is an exploded view of the electromagnet 4 according to the fourth preferred embodiment.

The electromagnet 4 includes a stacked body 71. The stacked body 71 is formed preferably by integrally stacking insulating base material layers 71A, 71B, 71C, and 71D. Each of the base material layers 71A, 71B, 71C, and 71D is made of thermoplastic resin having flexibility, such as LCP resin (liquid crystal polymer resin). The stacked body 70 is formed preferably by heat-sealing the base material layers 71A, 71B, 71C, and 71D to one another by hot pressing. FIG. 14 illustrates only four base material layers. However, the number of the stacked layers in the stacked body 71 is not limited thereto.

Four coils 72, 73, 74, and 75 are provided on the stacked body 70. The coils 72, 73, 74, and 75 are arranged such that in-plane coil conductors 72A, 73A, 74A, and 75A provided on the main surface of the base material layer 71A, in-plane coil conductors 72B, 73B, 74B, and 75B provided on the main surface of the base material layer 71B, in-plane coil conductors 72C, 73C, 74C, and 75C provided on the main surface of the base material layer 71C, and in-plane coil conductors 72D, 73D, 74D, and 75D provided on the main surface of the base material layer 71D are connected to one another with unillustrated interlayer connection conductors.

The in-plane coil conductors 72A, 73A, 74A, and 75A are provided on coil formation regions A11, A12, A13, and A14 of the base material layer 71A. The in-plane coil conductors 72B, 73B, 74B, and 75B are provided on coil formation regions A21, A22, A23, and A24 of the base material layer 71B. The in-plane coil conductors 72C, 73C, 74C, and 75C are provided on coil formation regions A31, A32, A33, and A34 of the base material layer 71C. The in-plane coil conductors 72D, 73D, 74D, and 75D are provided on coil formation regions A41, A42, A43, and A44 of the base material layer 71D.

Dummy patterns 76A, 76B, 76C, and 76D are provided on the region other than the coil formation region on the main surface of each of the base material layers 71A, 71B, 71C, and 71D. The dummy patterns 76A, 76B, 76C, and 76D are connected to one another with unillustrated interlayer connection conductors. These dummy patterns 76A, 76B, 76C, and 76D are electrically isolated from other elements including coils 72 to 75. As described in the first preferred embodiment, the dummy patterns 76A, 76B, 76C, and 76D define and function as a magnetic field shield for a magnetic field generated from the coils 72 to 75 upon a change in a current flowing through the coils 72 to 75, such that the intensity of the magnetic field is increased.

The stacked body 71 includes an opening 77A that penetrates in the stacking direction. The opening 77A is surrounded by four coils 72 to 75 in a plan view. A later-described camera lens is inserted into this opening 77A. The stacked body 71 also includes a cutaway section 77B extending from the opening 77A to the outer edge. The cutaway section 77B is located on a region where four coils 72 to 75 are not provided.

The base material layers 71A, 71B, 71C, and 71D are made of thermoplastic resin. With this configuration, when the base material layers 71A, 71B, 71C, and 71D are stacked, and formed integral preferably by hot pressing, the stacked body 71 generates internal stress due to a difference in thermal expansion coefficient between both the coils 72 to 75 and the dummy patterns and the base material layers 71A, 71B, 71C, and 71D. When the pressing pressure is released, the stacked body 71 warps due to the internal stress. In view of this, the cutaway section 77B is provided on the stacked body 71. The cutaway section 77B releases the internal stress to prevent the warpage of the stacked body 71.

The cutaway section 77B is able to be located at any position where the coils 72 to 75 are not formed. For example, in FIGS. 13 and 14, the cutaway section 77B is preferably located between the opening 77A and the outer edge of the long side of the stacked body 71. However, the cutaway section 77B may be located between the opening 77A and the outer edge of the short side of the stacked body 71. In this case, the length of the cutaway section becomes large, which releases more internal stress generated upon hot pressing.

The number of the coils in the electromagnet 4 is not limited to four. It is only necessary that a plurality of coils are provided. The position where the coils 72 to 75 are located is not particularly limited, so long as they are located at a position surrounding the opening 77A.

A non-limiting example of a production method of the electromagnet 4 will be described below.

Firstly, a copper foil is attached to one surface of a base material sheet made of thermoplastic resin. Alternatively, a sheet with copper attached to one surface is prepared. A resist film is patterned on the copper foil according to the in-plane coil conductors and the dummy patterns to be formed. An etching is performed to form each pattern, and then, the resist film is removed. Thereafter, each position where the interlayer connection conductor is to be formed is irradiated with laser light from the other surface (on which the copper foil is not attached) of each of the base material sheets to form a hole. A conductive paste containing Su, Cu, Ni, Ag, etc. is filled in this hole.

The formed base material sheets are stacked. In this case, each of the base material sheets is stacked on the main surface on which each pattern is formed. A heat and pressure treatment (hot press) is applied to the stacked base material sheets to bond these sheets. The base material sheets are thermoplastic resin as described above, so that an adhesive agent does not need to be used. Further, damage (crack) upon curing is prevented. The opening 77A and the cutaway section 77B are formed after the hot pressing of the stacked base material sheets. Thus, the electromagnet 4 is produced. With the opening 77A and the cutaway section 77B provided after the hot pressing of the stacked base material sheets, a loss of the shape due to a resin flow upon the hot press is prevented, and further, short-circuiting of the conductors hardly occurs.

The opening 77A and the cutaway section 77B are not necessarily formed after the hot pressing of the stacked base material sheets. Specifically, after the opening and the cutaway section are formed on each of the base material sheets, the base material sheets may be stacked, and hot pressing may be performed on the stacked base material sheets.

As in the first preferred embodiment, the electromagnet is able to be used as a so-called voice coil motor, when permanent magnets are disposed just above the coils 72 to 75. A camera module including the voice coil motor for a camera shake correction will be described below.

Figure 15:
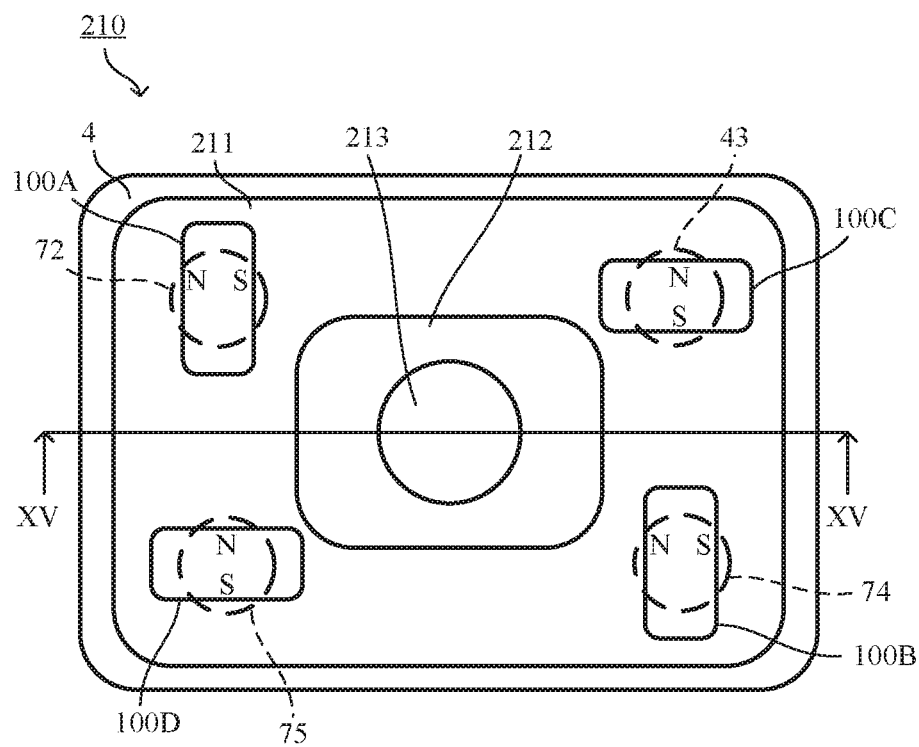
FIG. 15 illustrates a plan view of a camera module provided with the electromagnet according to the fourth preferred embodiment of the present invention, and a sectional view taken along a line XV-XV.
Figure 15:
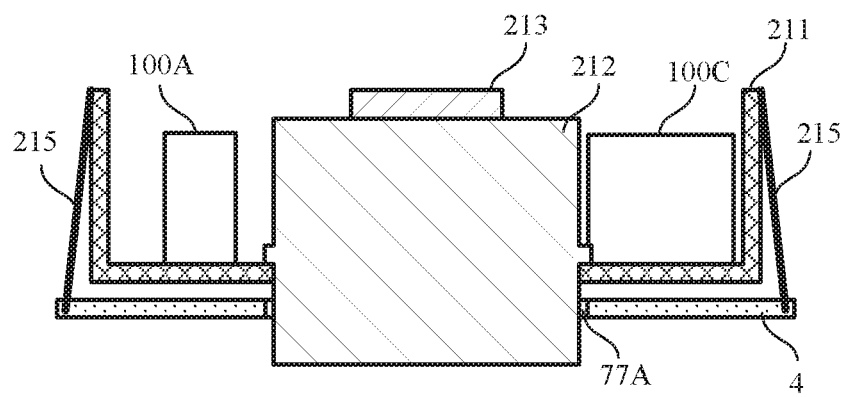

FIG. 15 illustrates a plan view of a camera module 210 provided with the electromagnet 4 according to the present preferred embodiment, and a sectional view taken along a line XV-XV. This camera module 210 is one example of a "camera lens driving device".

The camera module 210 includes the electromagnet 4 and a frame 211. The electromagnet 4 is provided below the frame 211 with a gap (e.g., about 500 μm or less) between the frame 211 and the electromagnet 4. The electromagnet 4 and the frame 211 are connected with a wire 215. The frame 211 is displaceable, and the displacement is restricted by the wire 215.

As described with reference to FIG. 13, the electromagnet 4 includes the opening 77A. The frame 211 includes a hole, not illustrated, located at the center of a flat plate, and this hole is overlapped with the opening 77A of the electromagnet 4. A lens holder 212 is inserted into the hole on the frame 211 and the opening 77A of the electromagnet 4, and is fixed at the hole of the frame 211. The lens holder 212 holds a camera lens 213. Specifically, the camera lens 213 is displaced together with the lens holder 212 and the frame 211 within a range inside of the opening 77A of the electromagnet 4.

Permanent magnets 100A, 100B, 100C, and 100D are provided on the flat plate of the frame 211 so as to surround the lens holder 212 on all four sides. These permanent magnets 100A, 100B, 100C, and 100D are disposed just above the coils 72 to 75 in the electromagnet 4.

The displacement of the camera lens 213 and other components is similar to FIGS. 8A and 8B, so that the description thereof will not be repeated.

As described above, in the present preferred embodiment, the coils 72 to 75 defining and functioning as an actuator are preferably integral, such that misalignment upon the arrangement is more significantly reduced or prevented than the case where the coils 72 to 75 are independently formed and used for the camera module 210. The electromagnet prevents warpage caused upon hot pressing to prevent displacement in the direction in which the electromagnetic force is generated. This enables precise displacement of the camera lens 213 in the camera module 210, thus achieving precise camera shake correction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stacked body comprising:
   a base including a plurality of insulating base material layers made of thermoplastic resin;
   a conductive pattern located on the plurality of insulating base material layers; and
   a dummy pattern electrically isolated from the conductive pattern and extending along at least a portion of the conductive pattern outside of the conductive pattern on the plurality of insulating base material layers on which the conductive pattern is located in a plan view; wherein
   the plurality of insulating base material layers are stacked on each other;
   the conductive pattern includes a plurality of linear portions at an outermost side of the conductive pattern in a plan view;
   the dummy pattern is located along the conductive pattern; and
   a bent portion or a wide portion, which has a larger width than the other linear portions in a direction perpendicular or substantially perpendicular to a direction in which a linear portion extends, in a plan view, is located on at least one of the linear portion of the conductive pattern and the dummy pattern extending along the linear portion, excluding an end portion of the linear portion and an end portion of the dummy pattern.

2. The stacked body according to claim 1, wherein the dummy pattern is located on the same insulating base material layer as a layer on which the conductive pattern is located.

3. The stacked body according to claim 1, wherein the dummy pattern is located on the plurality of insulating base material layers.

4. The stacked body according to claim 3, wherein the dummy pattern is located on all of the insulating base material layers on which the conductive pattern is located.

5. The stacked body according to claim 1, wherein a conductor connected to the dummy pattern and extending in a stacking direction in which the plurality of insulating base material layers are stacked is located on the insulating base material layer located above or below the dummy pattern in the stacking direction.

6. The stacked body according to claim 5, wherein:
the dummy pattern is located on the plurality of insulating base material layers; and
the conductor extending in the stacking direction connects the dummy patterns located on different insulating base material layers to each other.

7. The stacked body according to claim 1, further comprising:
a step at which a thickness of the stacked body varies in a stacking direction in which the plurality of insulating base material layers are stacked; wherein
the dummy pattern is located around the step at a portion defining the step at which the thickness of the stacked body is large.

8. The stacked body according to claim 1, wherein the dummy pattern sandwiches at least the conductive pattern in a plan view.

9. The stacked body according to claim 8, wherein the dummy pattern encloses the conductive pattern in the plan view.

10. The stacked body according to claim 9, wherein the dummy pattern is annular and encloses the conductive pattern in the plan view.

11. The stacked body according to claim 1, wherein the insulating base material layer is a flexible resin base material layer.

12. The stacked body according to claim 11, further comprising:
an opening penetrating in a stacking direction in which the plurality of insulating base material layers are stacked; and
a cutaway section extending from the opening to an outer edge; wherein
a plurality of the conductive patterns are provided around the opening; and
the cutaway section is provided at a position at which the plurality of conductive patterns are not provided.

13. The stacked body according to claim 1, wherein the conductive pattern includes a coil portion including a winding-shaped conductive pattern.

14. A method of producing a stacked body in which a plurality of insulating base material layers made of thermoplastic resin are stacked, the method comprising steps of:
stacking the plurality of insulating base material layers made of thermoplastic resin;
forming a dummy pattern and a conductive pattern on at least one of the plurality of insulating base material layers; wherein:
the dummy pattern is disposed outside of the conductive pattern and is electrically isolated from the conductive pattern;
the conductive pattern includes a plurality of linear portions at an outermost side of the conductive pattern in a plan view;
the dummy pattern extends along the conductive pattern; and
a bent portion or a wide portion, which has a larger width than the other linear portions in a direction perpendicular or substantially perpendicular to the direction in which the linear portion extends, in a plan view, is located on at least one of a linear portion of the conductive pattern and the dummy pattern extending along the linear portion, excluding an end portion of the linear portion and an end portion of the dummy pattern; and
integrating the stacked plurality of insulating base material layers by applying heat and pressure.

15. The method of producing a stacked body according to claim 14, further comprising the steps of:
forming an opening penetrating in a stacking direction in which the plurality of insulating base material layers are stacked, in the plurality of insulating base material layers; and
forming a cutaway section extending from the opening to outside in the plurality of insulating base material layers.

16. The method of producing a stacked body according to claim 15, wherein the step of forming the cutaway section includes a step of forming the opening and the cutaway section after the plurality of insulating base material layers are integrated in the step of integrating.

* * * * *